United States Patent [19]

Vergnaud et al.

[11] Patent Number: 4,984,234

[45] Date of Patent: Jan. 8, 1991

[54] TIME-DIVISION SWITCHING SYSTEM

[75] Inventors: Gérard Vergnaud, Franconville; Gérard Thomas, Eragny Sur Oise, both of France

[73] Assignee: Societe Anonyme Dite: Telic Alcatel, Paris, France

[21] Appl. No.: 299,152

[22] Filed: Jan. 19, 1989

[30] Foreign Application Priority Data

Jan. 22, 1988 [FR] France ................. 88 00697

[51] Int. Cl.$^5$ .......................................... H04Q 11/04
[52] U.S. Cl. .................. 370/58.1; 370/85.1; 370/68.1
[58] Field of Search ............ 370/58, 67, 68.1, 79, 370/81, 95.1

[56] References Cited

U.S. PATENT DOCUMENTS

| 4,390,982 | 6/1983 | Williams et al. ................ 370/67 |
| 4,488,294 | 12/1984 | Christensen et al. ............ 370/110.1 |
| 4,510,596 | 4/1985 | Hartmann et al. .............. 370/79 |
| 4,577,310 | 3/1986 | Korsky et al. ................ 370/67 |
| 4,639,910 | 1/1987 | Toegel et al. . |
| 4,679,187 | 7/1987 | Irvin ....................... 370/79 |

FOREIGN PATENT DOCUMENTS 2557751 7/1985 France.

OTHER PUBLICATIONS

IEEE Communications Mag.-vol. 21, No. 3, May 1983, pp. 47-52-M. Kajiwara-"Trends in Digital System Architecture".

Primary Examiner—Douglas W. Olms
Assistant Examiner—Christopher O. Edwards
Attorney, Agent, or Firm—Sughrue, Mion, Zinn, Macpeak & Seas

[57] ABSTRACT

A time-division switching system, in particular a multiservice key telephone or PABX system, is controlled by programmed management logic and synchronized by a timebase for selective on-demand exchange of information between terminations to which telecommunications terminals are connected either directly or through links to other, identical or at least compatible switching systems. The system includes programmed system management logic based on an optionally duplicated processor with directly addressable memory which stores all command operations, in particular those for switching information exchanged by means of the terminations which are connected in parallel to a port of the processor by a bus-type time-division multiplex link.

9 Claims, 5 Drawing Sheets

TIME-DIVISION SWITCHING SYSTEM

BACKGROUND OF THE INVENTION

1. Field of the invention

The invention concerns time-division switching systems, especially multiservice key telephone or PABX systems.

2. Description of the prior art

These systems provide selective and on-demand transmission of information between telecommunication terminals connected to them. They are able to function either in isolation or within telecommunication networks made up of identical or compatible systems.

Each system has an internal switching network to the inputs and outputs of which are connected terminations for telephone links providing interconnection to other systems and/or for information communication terminals. The switching network of a known time-division switching system stores temporarily the information that it switches, the information being broken down into successive samples for this purpose.

A timebase synchronizes memorization and transmission of samples by the switching network.

Control logic sets up communications between terminations through the switching network. It usually comprises at least one management processor associated with dedicated auxiliary equipments performing the various tasks involved in the functioning of the system.

These auxiliary equipments often comprise processors implementing specific functions for which they are sometimes specifically structured.

This results in systems with hardware and software architectures incorporating redundancies and anomalies which generally increase with time as modifications are made to meet changing user requirements. Systems of the same design therefore tend to become increasingly diversified and their operation tends to become degraded.

SUMMARY OF THE INVENTION

The present invention consists in a time-division switching system for selective on-demand exchange of information between terminations adapted to be connected to telecommunications terminals either directly or through links to other, identical or at least compatible switching systems, said switching system comprising said terminations, a timebase for synchronizing its operation and programmed management logic incorporating an optionally duplicated processor and directly addressable memory which is adapted to store programs and all data including digitized signal bits and to provide storage for all control operations and in particular those for switching information exchanged through the terminations and a bus link functioning in real time by which said terminations are connected in parallel to said processor, wherein said terminations convert signals from said terminals or links with other systems into a digital form acceptable by said processor and transmissible by said bus link and vice versa.

The invention, its characteristics and its advantages are specified in the following description with reference to the figures listed below.

DESCRIPTION OF THE PREFERRED EMBODIMENT

Figure 1:
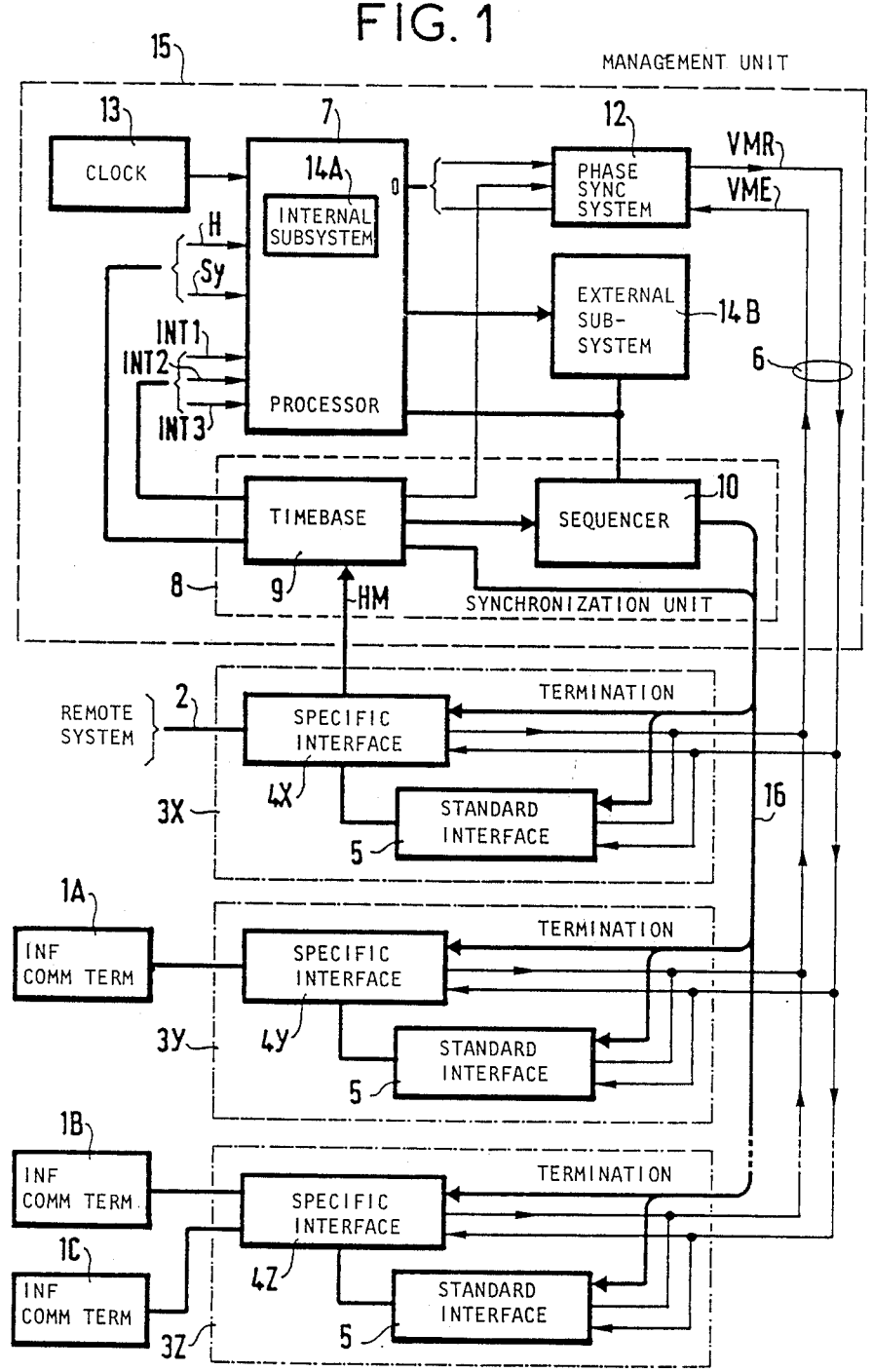
FIG. 1 is a block diagram of a time-division switching system in accordance with the invention.

The time-division switching system shown in FIG. 1 is designed for selective and on-demand interconnection of information communication terminals 1, either directly if the terminals are connected to the system itself as are terminals 1A, 1B, 1C in FIG. 1, or indirectly if the terminals are connected to other systems which are connected to the system under consideration here by interconnecting telephone links, one such interconnecting link 2 to a remote system being also shown in FIG. 1.

The information communication terminals 1 convert information which they receive from man or machine into signals which are immediately or subsequently coded or transcoded and formatted so that they can be transmitted and switched; they generally also perform the opposite conversion of signals received from the system into information understandable by man and/or usable by machines.

The information communication terminals considered therefore include those connected to a switching system through "SO or Z" type interfaces in accordance with CCITT recommendations. Such terminals comprise, for example, analog or digital telephone sets, key telephone systems, facsimile machines, telephone answering machines, communicating personal computers, interactive videographics terminals, teleaction terminals, etc.

The interconnecting links 2 may be conventional analog type central office lines but are preferably time-division multiplex links.

Figure 3:
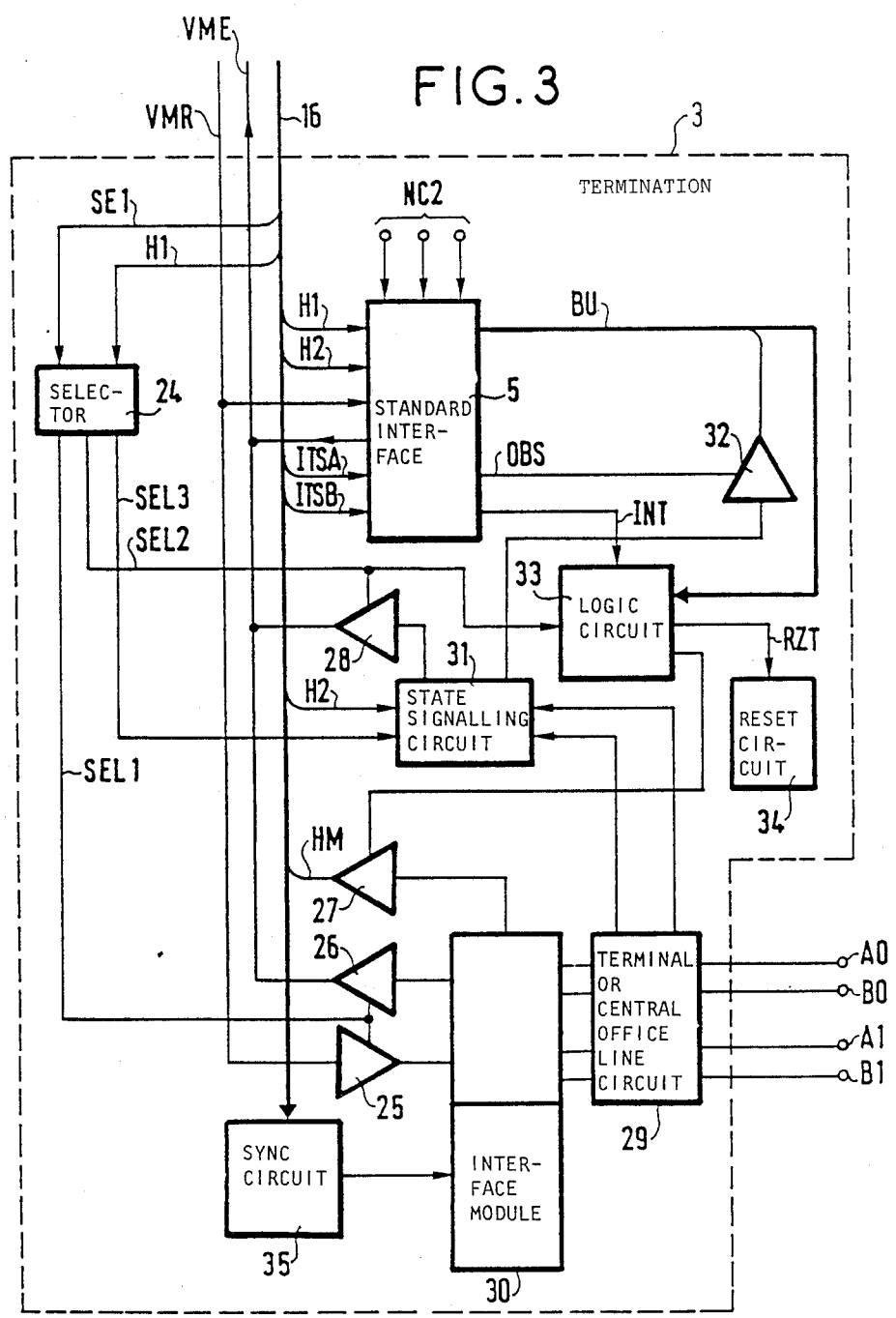
FIG. 3 is a block diagram of one example of a line or "ISDN" terminal termination.

The terminals 1 and the interconnecting links 2 connected to the system terminate at terminations 3 (3X, 3Y, 3Z) which are optionally shared by a number of terminals or by a number of links and at least some of which may be connected to a single terminal or a single interconnecting link, such as the termination 3X shown in detail in FIG. 3, for example.

The time-division switching system terminations comprise in exactly the same way specific interfaces 4 (4X, 4Y, 4Z) to which are connected the terminals and interconnecting links between systems and standardized interfaces 5 connected in parallel with the specific interfaces to the core of the time-division switching system.

The standard interfaces 5 of the terminations are designed so that signaling information is exchanged with the core of the system in a uniform way; each therefore transmits and receives signaling information passed between the termination that incorporates it and this core.

The specific interfaces 4 (4X, 4Y, 4Z) carry out the necessary conversions for transmitting information between the terminals or interconnecting links and the core of the system, via the standard interfaces 5 in the case of signaling; they also perform the necessary changes of levels and formats and/or the conversions relating to any differences between the terminals dependent on their use and between different variants of the interconnecting links.

The specific interfaces 4X and 4Y, preferably each comprise a "SO/TO" type interface according to CCITT recommendations which can be configured to serve as an access port either to an interconnecting link 2 or to a terminal where the time-division switching system is used in an integrated services digital network (ISDN), and therefore in accordance with the corresponding standards.

The specific interface 4Z, for example, is a "Z" type interface for analog telephone set lines which constitute the terminals 1B and 1C.

According to the invention the specific and standard interfaces of the time-division switching system terminations are connected in parallel by a bus link 6 to a serial data input-output port O of a processor 7 the memory of which stores temporarily, for the purposes of time-division switching, signals originating from the terminals 1 and interconnecting links 2 via the terminations 3 and which are intended to be transmitted further.

In the example under consideration the bus link 6 comprises two time-division multiplex links VME and VMR respectively reserved for signals transmitted to the processor 7 from the terminations and for the signals travelling in the opposite direction.

In the case of a small system this bus link is, for example, a 2.048 Mbit/s PCM link.

A synchronization unit 8 allocates the bus link 6 periodically and selectively to each of the terminations for it to exchange information with the processor 7.

The synchronization unit 8 comprises a timebase 9 associated with a sequencer 10 for configuring the PCM channels according to the terminations served, the latter transmitting an indication to this effect each time the system is initialized. The timebase 9 is controlled by an internal clock if the system is a stand-alone or master system; it is controlled by an external clock if the system is a slave of another system to which it is connected. In the example under consideration the interconnecting link 2 transmits control clock signals supplied by the remote system, these being transmitted to the timebase 9 by active circuits of the interconnection link 2 and via the termination 3X and a master clock link HM.

The timebase 9 comprises, for example, a counting subsystem controlled by a voltage-controlled oscillator and in this particular instance it also decodes specific times.

The timebase 9 supplies clock signals H and synchronization signals SY to the processor 7 for transmission and reception of data on the bus link 6 and to a phase synchronization system 12 which controls the phase of the data transmitted to facilitate recovery of the data at the processor or terminations. The system 12 is a conventional system based on flip-flop circuits.

The timebase 9 also supplies to the sequencer 10 repetitive signals enabling it to select the circuits to be activated in the terminations to transmit and receive data on the bus link 6.

Finally, the timebase 9 produces cyclic interrupts INT1, INT2 and INT3 supplied to the processor over links INT1, INT2 and INT3 to ensure that the system operates according to a process that will be explained later.

The processor 7 is a signal processor with a rating of at least 10 MIPS in the case of a small system.

It is, for example, a TEXAS INSTRUMENTS TMS 320 C25 microprocessor using a HARVARD type internal architecture in which programs and data are in separate addressable spaces, the memories being served by an address bus and a data bus accessible from outside the processor.

This microprocessor incorporates two arithmetic and logic units, one dedicated to address processing and the other to data processing.

An autonomous external clock 13 drives the processor 7, delivering a signal at a frequency of 40 MHz.

The memory system associated with the processor 7 includes an internal subsystem 14A comprising random access memory and read-only memory and an external subsystem 14B also comprising random access memory and read-only memory. The external memories have standard access times. The distribution and location of these memories may be different and must not be regarded as significant in the context of the invention.

The external memory subsystem 14B stores the system management programs, for example, and higher level programs managing in particular the SO and TO access ports previously mentioned or telephone operating programs for the interfaces specific to analog telephone sets.

Low level and signal processing programs (for example: HDLC type functions, detection of O23 type codes, conference call processing) are stored in the internal subsystem 14A and use the random access memory as as data field.

At least part of the random access memory is preferably provided with a backup power supply, in the form of batteries, for example.

At least one area in the random access memory can be shared by two processors 7, enabling duplication of the processor for security reasons as is standard practise in many switching systems.

Most of the functions implemented by the time-division switching system are implemented in software by the management unit 15 comprising the processor 7 and its auxiliaries, essentially the clock 13, the synchronization unit 8 and the external memory subsystem 14B.

The functioning of the system will be explained later, after further component parts are defined.

Figure 2:
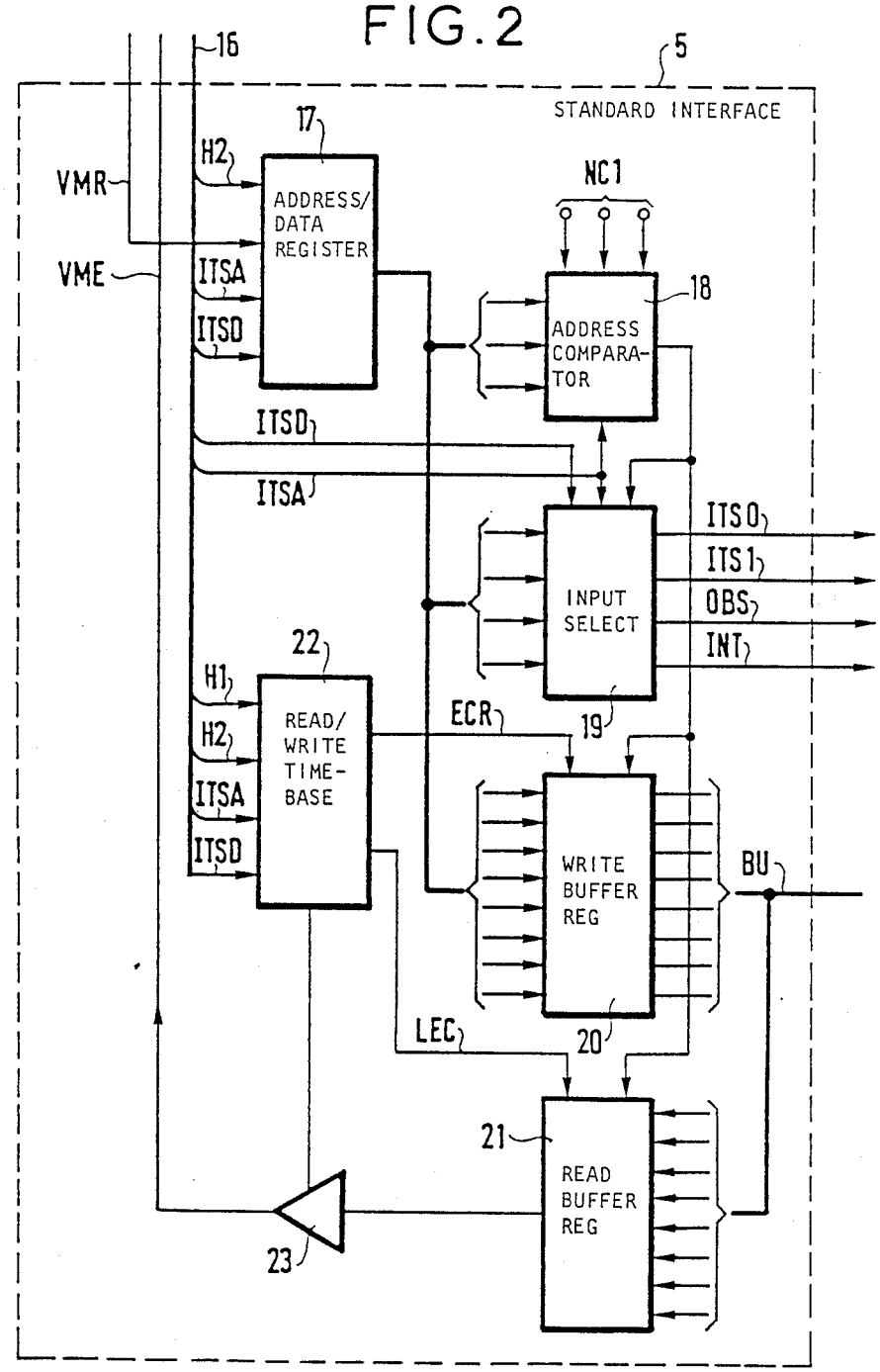
FIG. 2 is a block diagram of one example of a standardized interface circuit for terminations of a time-division switching system in accordance with the invention.

FIG. 2 shows one example of a standard interface 5; as already mentioned, this interface is connected by lines VME and VMR of the access bus link to the serial input/output port of the processor 7.

A common link 16 connects each standard interface to the synchronisation unit 8. The link 16 carries on its various lines clock signals H1, H2 from the timebase 9 and time slot reservation signals ITSA, ITSD from the sequencer 10.

At least two time slots are needed for bidirectional transmission of data between the management unit 15 and a termination 3 under the control of the management unit 15; one time slot ITSA is used to transmit the address of the standard interface concerned and a second time slot ITSD enables bidirectional transmission of signaling data between the management unit and the termination concerned. These two time slots may be in different frames.

An address/data register 17 receives the signals ITSA, ITSD and distinguishes address data from signaling data which are both transmitted serially to the register 17 over the link VMR. This register also receives the clock signal H2 for acquiring this data.

An address comparator 18 compares the address received over the link VMR with a hardwired standard interface address NC1. The output of the comparator 18 activates an input selector 19 and two buffer registers 20 and 21 if the address is recognized.

The input selector 19 receives the signals ITSA, ITSD and, in parallel, four of the eight data bits supplied on the link VMR during one time slot; it provides a forward transfer signal INT, an observation command OBS and two signaling time slot indications ITSO and ITSI on respective different lines terminating at the associated specific interface 4 in the same termination 3.

The write buffer register 20 receives in parallel the eight data bits supplied on the link VMR during a time slot when activated by the comparator 18 and by a write command supplied by a local write/read timebase 22.

It transmits the data bits in parallel on the links of a link BU which connects it to the associated specific interface 4.

The local timebase 22 receives the signals H1, H2, ITSA, ITSD from the synchronization unit 8 on corresponding lines of link 16 for the purposes of acquiring and transferring signaling data concerning the termination 3 comprising it.

The parallel input/serial output type read register 21 has its inputs connected to the lines of the link BU on which it receives signaling data from the specific interface 4 associated with the standard interface 5 which comprises it. It is controlled by the local timebase 22 via a read control line and by serially output signaling data that it receives from the associated specific interface 4 and stores temporarily. A conventional tristate access gate 23 is connected between the read register 21 and the link VME and is controlled by the local timebase 22 which activates it during the time slots reserved for transmitting signaling for the termination concerned.

FIG. 3 shows one example of an integrated service digital network (ISDN) line or terminal termination including a standard interface 5 and a specific interface 4 (the interface 4X or 4Y from FIG. 1).

The specific interface 4 (4X or 4Y) is connected to the link 16 from the synchronization unit and to the lines VME, VMR of the bus link 6 in parallel with the standardized interface 5 of the termination which comprises it.

The standard interface 5 receives the signals H1, H2, ITSA, ITSD from the link 16, is connected to the lines VME and VMR, receives a hardwired address indication NC1 identifying the termination which comprises it to the core of the system, supplies the signals INT, OBS and is able to exchange signaling data with other components of the termination via the lines of a link BU.

The specific interface 4 comprises a selector 24 receiving the clock signal H1 from the timebase 9 and a termination select command SE1 from the sequencer 10 for the purposes of exchanging data with the core of the system via the lines VME and VMR. To this end the selector 24 controls a series of gates 25, 26, 27, 28 providing transmit mode access to the line VME and receive mode access to the line VMR.

The gates 25, 26 are controlled by the selector 24 via a link SEL during the time slot or slots reserved for the termination containing them. They enable connection of the lines VME and VMR with the four ISDN line or terminal wires A0, B0, A1, B1 via a central office line or terminal circuit 29 in series with an interface module 30.

The circuit 29 of a terminal 1A or an ISDN access line 2 conventionally comprises two transformers each assigned to one of the pairs of wires A1, B0 or A1, B1, a phantom power feed for the terminal, a wire pair voltage surveillance circuit, protection arrangements and an input filter. This line or terminal circuit 29 can be configured as required and communicates over four wires with the interface module 30 and over two wires with a state signaling circuit 31 connected for transmission to the line VME via the gate 28 and to one of the lines of the link BU via an access gate 32.

The state signaling circuit 31 also receives the signal H2 and a select command SEL3 from the selector 24. The gates 28 and 32 are respectively controlled by a select command SEL2 from the selector 24 and the observation command OBS from the associated standard interface 5.

The interface module 30 handles exchange of data between the gates 25, 26 and the lines A0, B0, A1, B1.

It is, for example, a THOMSON TS5420 or SIEMENS PEB 2080 level "1" circuit which is configured in "NT" master mode for the terminal configuration "S0" or "NT" slave mode for the central office line configuration "T0".

Clock signals are extracted from the central office line in the case of a "T0" configuration. They are applied to the master clock line HM via the gate 27 to slave the timebase 9 of the system to the master clock of the remote system which is in this case transmitted over the wires A0, B0, A1, B1 of the central office line 2.

The gate 27 is activated by a logic circuit 33 which is connected to the link BU and receives the select command SEL2 and a command INT from the associated standard interface 5 and transmits the signals from the remote master clock to the timebase 9.

The logic circuit 33 also resets the whole of the time-division switching system through a reset circuit 34 as required and manually in response to an operator command or when remote controlled by the management unit via the link BU, the links with the relevant parts of the system not being shown here.

A synchronization circuit 35 synchronizes transmission of signals by the interface module 30 and is connected to the timebase 9 by the link 16 provided for this purpose.

Figure 4:
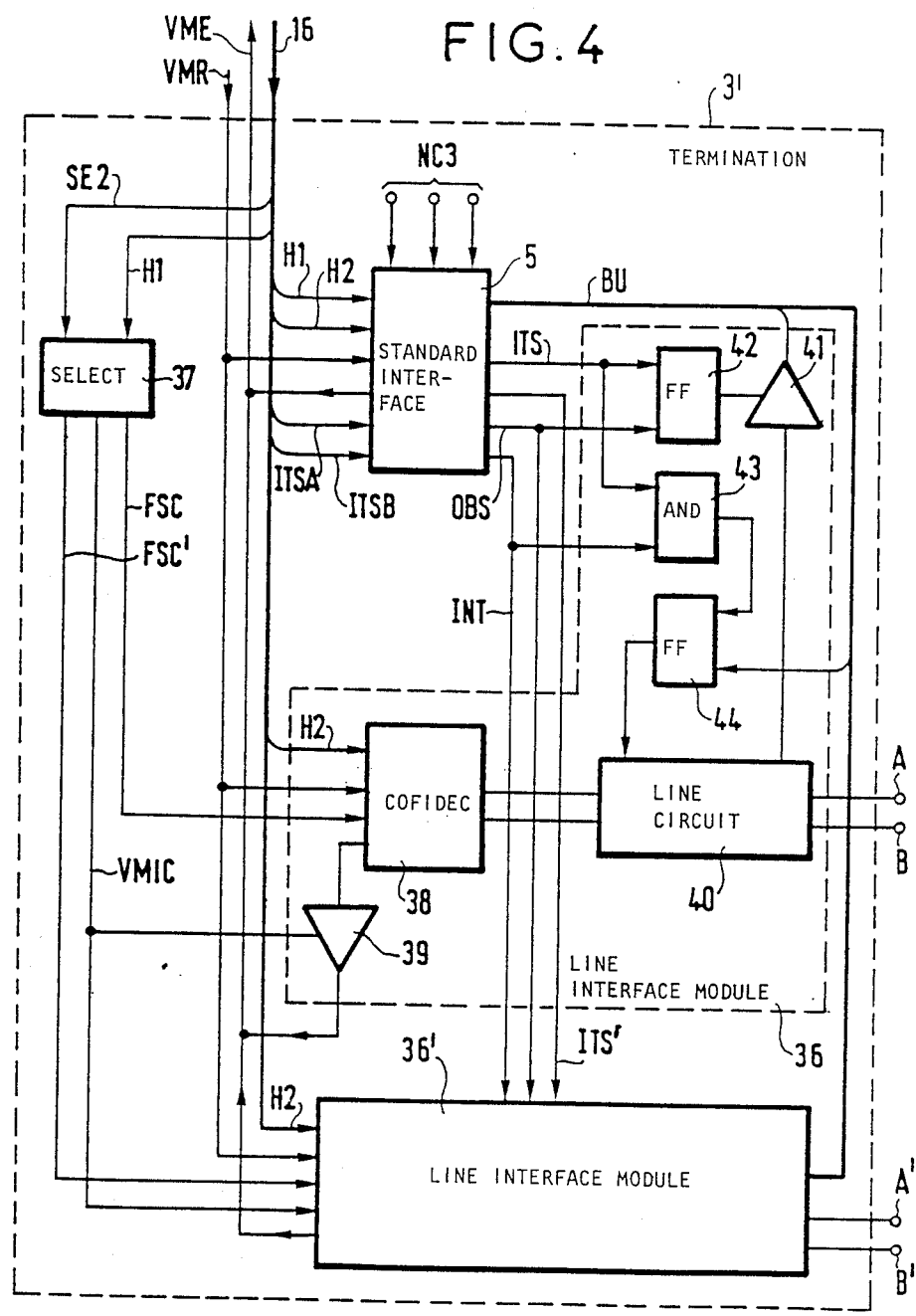
FIG. 4 is a block diagram of one example of a termination for an analog telephone line.

FIG. 4 shows another example of a termination for terminals. This is a termination for analog telephone sets connected to their local exchange by two-wire subscriber lines.

The two-wire line serving a telephone set is conventionally connected to a line interface circuit 36 or 36'. The line interface circuits 36, 36' and a selector 37 then constitute the specific interface which, in association with a standard interface 5, forms a termination 4' for analog telephone sets of which two are shown here, respectively connected to wires A, B and A', B'.

The standard interface 5 of the termination 4 is assigned an address NC3 which serves to identify the termination. It is connected to the link 6 and to the lines VME, VMR in the same way as the other standard interfaces.

Each line interface circuit 36 and 36' is connected to the lines VME and VMR and also receives the clock signal H2 from the link 16, a transmit command VMIC from the selector 37 and a synchronization signal FSC or FSC'. To this end the selector 37 receives a termination select signal SE2 from the sequencer 10 and the clock signal H1 from the timebase 9 via the link 16.

The lines VME and VMR are connected to a COFI-DEC type circuit 38 which in each line interface circuit 36 or 36' conventionally converts signals transmitted in analog form on the wires A, B or A', B' into PCM samples and vice versa at a rate determined by the synchronization signal received via the link FSC for the line interface circuit 36 and via the link FSC' for the line interface circuit 36'.

A tristate access gate 39 connects the COFIDEC circuit 38 of each line interface circuit to the line VME. It is activated by the selector 37 via a link VMIC during frame time slots reserved for the termination 4' in question.

A line circuit 40 is the interface between the COFI-DEC circuit 38 and the wires A, B.

In the conventional way this line circuit implements the functions of powering the telephone set connected to the wires A and B, impedance matching, ringing signal generation and injection, loop sensing and two-wire/four-wire splitting.

The various forms of signaling pass through the standard interface 5 of the termination 4' in question.

To this end each line circuit is connected to one line of the link BU through an access gate 41 controlled by the standard interface.

A flip-flop 42 with its output connected to the control input of the access gate 41 receives to this end the observation command OBS and a select command ITS or ITS' specific to the line circuit in question and to the frame time slot reserved for signaling of this circuit in each superframe.

Signaling from the management unit 15 to a line circuit is transmitted by at least one logic component combining an AND gate 43 and a flip-flop 44. The flip-flop 44 receives the signaling on one line of the link BU and is triggered by the signal from the gate 43 on simultaneous reception of the signal ITS or ITS' and the forward transfer signal INT supplied to it by the standard interface 5 of the termination comprising it.

The above description of the system shows the degree of integration achieved with regard to the functions usually implemented in hardware, only physical level functions remaining implemented in hardware.

The management unit 15 handles the real time tasks concerning input and output of data via the serial link 6 connecting the terminations 3 to the processor 7, for example time-division connections (in this instance with potential simultaneous data rates of 32, 64 or 128 kbit/s), detection of signaling in the standardized 0.23 code, filtering of signaling, processing of HDLC signals in the D channel of ISDN lines and terminals, tone generation and conference call processing. It also handles application and telephone management tasks.

Although this is not shown in the drawings, provision is also made for adding a universal asynchronous receiver/transmitter (UART) to the processor 7 to enable the individual connection of management or maintenance equipment through a standard transmission link, of the V.24 or V.28 type, for example. This provides access to the processor memories by means of a computer or keyboard/screen terminal able to send and receive data over a link of this kind.

The processor 7 receives signaling from the terminations via the lines VME, in particular information relating to the loop state of the telephone lines, to signaling demodulated by digital telephone line terminations, to indications supplied by the ISDN terminations and to data received via the D channels of the latter.

The processor 7 transmits observation and forward transfer signals and "HDLC" frame data via the line VMR to the terminations.

The lines VME, VMR also enable the processor 7 to access digitized speech signals and data passing through the time-division switching system.

The processor 7 interprets in-band signaling and synthesizes signaling of this kind to transmit same to the terminations. It also handles the switching and conference call functions.

The link 6 carries the time slots assigned to the terminations. The management unit 15 automatically configures the frame according to the terminations connected to the link on the basis of information supplied by each termination concerning its type and modularity, when operation is begun and after any modification or shutdown.

The softward comprises three levels respectively corresponding to the system software (executed in the processor 7), signaling processing software and application-specific software.

The system software handles multitasking management and intertask protection, resource sharing, synchronization and intertask communications. It also implements the processor 7 system services providing memory management, time-delay, input/output and clock facilities.

In particular, the system software handles calibration of events to be produced in real time and decoding of coherent combinations of micro-events to procure in the latter case automatic signaling function.

The signal processing software is for the most part contained in the internal memory subsystem 14A of the processor so as to be available for quick access. It concerns signaling, that is to say detection of changes of state, and the actual signal processing tasks (for example, detection of flags, extraction of stuffing bits for HDLC type frames, summation of real time signals received in the case of a conference call).

The application software is the telephone administration software, held in the external memory subsystem 14B of the processor since speed of access is not critical.

The telephone management software is divided into two layers, an administration layer independent of what type of terminations 3 are connected to the management unit 15 and a termination layer which handles the specific features of these terminations.

In particular, the termination layer handles the function of physical/logical conversion, translation, supervision, management of auxiliaries and timing as well as call management.

The operation layer serves to sense the status of links between terminations and to modify this status in line with responses and confirmations from the termination layer.

The dialog between the program and the actions to be performed on the terminations is effected by means of the internal or external random access memories of the processor into which the data of this dialog is written. The processor 7 has the speed to process digital high-speed real time samples and, for example, to process DTMF signaling transmitted by PCM encoded time slots; it is also able to interwork with low-speed peripherals by virtue of internal telephone management wiring included in the external subsystem 14B.

Operation of the processor 7 is timed by interrupts generated cyclically by the timebase 9.

Figure 5:
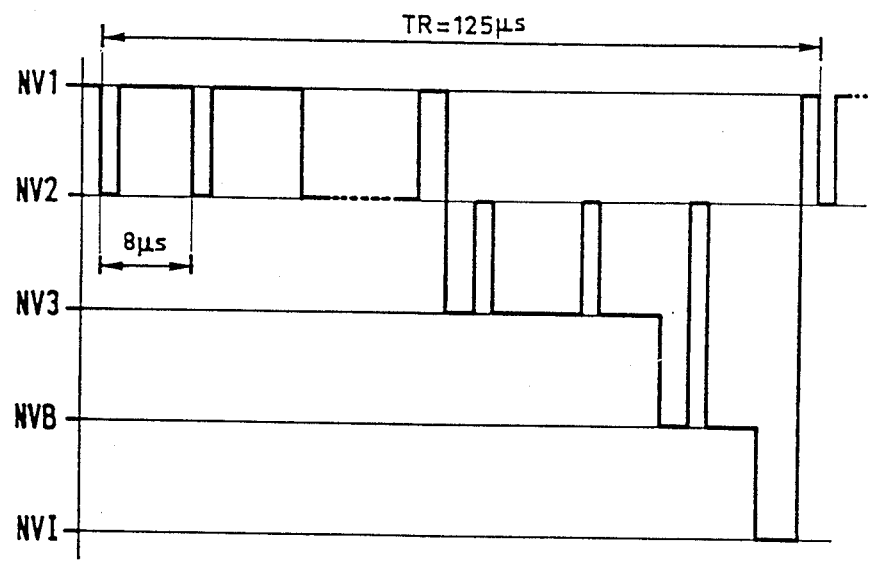
FIG. 5 is a timing diagram showing the interrelationship of interrupts in a system in accordance with the invention.

Three external interrupt levels are provided (NV1, NV2, NV3 in FIG. 5). Each corresponds to a different interrupt cycle.

Figure 6:
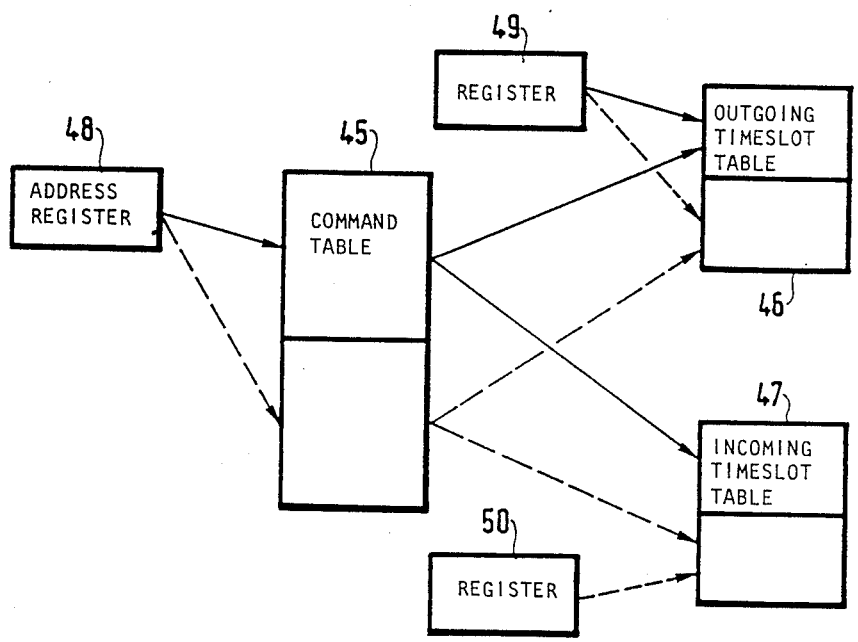
FIG. 6 is a diagram showing the organization of a partial memory arrangement of the processor of the system in accordance with the invention.

The hardwired priority interrupt INT1 of level NV1 occurs every 125 microseconds, which is the duration of a frame TR in this example. It triggers the signal processing tasks and is able to transfer its priority by means of a set of masks provided for this purpose. The signal is processed by means of a command table 45 (FIG. 6) written by higher levels of the software. In this example three lines are reserved in the table for each outgoing time slot. The first line addresses the program executing the required function (for example, connection, Q.23 signaling detection, tone generation, conference call, etc). The command table is duplicated so that functioning is not disrupted by problems related to operation of the serial link. In particular, writing and reading in a table during a frame are done in different parts of this table.

The second line gives the address of the time slot concerned in an outgoing time slot table 46 which is also duplicated for the same reasons.

The third line defines a parameter which varies with the task. In the case of a connection task, this parameter is the address of a time slot in a duplicated incoming time slot table 47. The tables 46 and 47 are addressed separately by registers 49 and 50.

The interrupts INT1 read the first line of the command table 46 which results in a branch to the first task to be performed. To this end they use a specific address register 45 which points to the lines of the command table.

All tasks terminate in exactly the same way by incrementing the specific address register 48, loading an accumulator with the content of the address pointed to in the address register and branching to the address in the accumulator. The tasks therefore call one another directly.

The interrupt INT1 also initializes working pointers for the interrupt INT2 of level NV2 with a faster cycle, the latter operating on three address registers of the processor 7 respectively used to address the input table of incoming time slots, to address the output table of outgoing time slots and to serve as a working register.

To this end the interrupt INT2 occurs every eight microseconds starting from an interrupt INT1 and therefore manages the input/output of data on the lines VME, VMR of the serial link 16.

In this example the processor 7 is a 16-bit processor which corresponds to the content of two time slots, each time slot having a duration of four microseconds.

When the priority save and initialization processing due to the interrupt INT1 is terminated, the processing requested by the interrupt INT2 is resumed, and the same goes for the processing instigated by the interrupt INT3 and by the basic level loop.

The interrupt INT3 of level NV3 occurs every eight milliseconds and is used to perform the real time tasks of the telephone administration system, such as dialing synchronization, for example.

After processing priority tasks requested by the interrupts, the processor 7 processes non-priority tasks; if the base level NV3 is reached (FIG. 5) when all the tasks are acquitted, the processor 7 may go to the idle state corresponding to the level NVI in FIG. 5.

There is claimed:

1. A time-division switching system for selective on-demand exchange of information between terminations adapted to be connected to telecommunications terminals either directly or through links to other, identical or at least compatible switching systems, said time division switching system comprising said terminations for converting said information into digitized speech and signalling bits, a timebase for synchronizing its operation, and programmed management logic incorporating a processor and memory which is directly addressable by said processor and which is adapted to store, in memory space directly addressable by said processor, programs and all data including said digitized speech and signalling bits and to provide storage in said directly addressable memory space for all control operations and in particular for the switching of information exchanged through the terminations, and a bus link functioning in real time by which said terminations are connected in parallel to said processor, wherein said terminations convert signals from said terminals or links with other systems into a digital form acceptable by said processor and transmissible by said bus link and vice versa.

2. A time-division switching system according to claim 1 wherein said processor processes all signaling exchanged through the intermediary of said terminations with said terminals connected directly or indirectly to the system and optionally with other switching systems via said links.

3. A time-division switching system according to claim 1 wherein said processor has a port through which all information to be connected and signaling to be exchanged passes between said terminations and said processor.

4. A time-division switching system according to claim 1 wherein said programmed management logic comprises a timebase and an associated sequencer adapted to configure time-division frames under the control of said processor according to the type and modularity of said terminations connected to said processor by defining the position and number of time slots assigned to each termination on said bus link on the basis of an indication transmitted by said termination to said processor in an initialization phase, said bus link being of the time-division multiplex link type.

5. A time-division switching system according to claim 2 wherein said timebase times the operation of the processor of said programmed management logic by means of three cyclic interrupts, namely:

a priority interrupt the period of which, related to processing of the signal, corresponds to the duration of one system time-division frame, a cyclic interrupt for management of input/out via the connection between said terminations and said processor, the period of which is related to the duration of a frame time slot, and a cyclic interrupt for real time management of telephone tasks.

6. A time-division switching system according to claim 4 wherein said processor executes software for real time processing of high-speed signals received by said terminations and three-level management software combining operating software of the processor itself, software for processing signaling and application software handling telephone management and in turn divided into two layers, an operating layer independent of the terminations connected and a layer allowing for the specific features of said terminations.

7. A time-division switching system according to claim 6 further comprising internal and external memory subsystems associated with said processor and wherein said application software is held in said external memory subsystem of said processor and said signal processing software is held in said internal memory subsystem of said processor.

8. A time-division switching system of the PABX type according to claim 1 wherein said terminations each comprise a standard interface for handling exchanges of signaling between said termination and said processor and a specific interface which is adapted to be connected to at least one terminal or link type equipment to be connected to the system and which handles exchanges between the equipment or equipments connected to said termination and said processor.

9. A time-division switching system comprising:
at least two subsystems for selective on-demand exchange of information between terminations adapted to be connected to telecommunication terminals either directly or through links to other identical or at least compatible switching systems, said switching subsystems each comprising said terminations for converting said information into digitized speech and signalling bits, a timebase for synchronizing its operation and programmed management logic incorporating a processor and memory which is directly addressable by said processor and which is adapted to store, in memory space directly addressable by said processor, programs and all data including said digitized speech and signalling bits and to provide storage in said directly addressable memory space for all control operations and in particular for the switching of information exchanged through said terminations, and a bus link functioning in real time by which said terminations are connected in parallel to said processor, wherein said terminations convert signals from said terminals or links with other systems into a digital form acceptable by said processor and transmissible by said bus link and vice versa, and
at least one link to a termination of each subsystem whereby said subsystems are interconnected.

* * * * *